(12) United States Patent
Thomas (10) Patent No.: US 7,862,073 B2
(45) Date of Patent: Jan. 4, 2011

(54) SPLIT TOP AIR BAG ASSEMBLY

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 218 days.

(21) Appl. No.: 12/133,556

(22) Filed: Jun. 5, 2008

(65) Prior Publication Data

US 2009/0302587 A1 Dec. 10, 2009

(51) Int. Cl.
*B60R 21/22* (2006.01)
*B60R 21/24* (2006.01)

(52) U.S. Cl. ............... 280/729; 280/732; 280/743.2

(58) Field of Classification Search ............... 280/732, 280/729, 743.2; *B60R 21/22, 21/24*
See application file for complete search history.

(56) References Cited

U.S. PATENT DOCUMENTS

| | | | |
|---|---|---|---|
| 3,792,873 | A | 2/1974 | Buchner |
| 6,883,832 | B2 | 4/2005 | Keutz |
| 2003/0230883 | A1 | 12/2003 | Heym |
| 2004/0145160 | A1 | 7/2004 | Hasebe |
| 2004/0145161 | A1 | 7/2004 | Hasebe ............... 280/729 |
| 2004/0160048 | A1 | 8/2004 | Hasebe |
| 2004/0164526 | A1 | 8/2004 | Hasebe |
| 2004/0232681 | A1 | 11/2004 | Adomeit |
| 2005/0104339 | A1 | 5/2005 | Hasebe |
| 2005/0110249 | A1 | 5/2005 | Hasebe |
| 2005/0184489 | A1 | 8/2005 | Kobayashi |
| 2005/0212275 | A1 | 9/2005 | Hasebe |
| 2006/0066089 | A1 | 3/2006 | Hasebe |
| 2006/0131859 | A1 | 6/2006 | Kumagai |
| 2006/0186655 | A1 | 8/2006 | Ehrke |
| 2006/0220364 | A1 | 10/2006 | Klinkenberger |
| 2006/0290112 | A1 | 12/2006 | Hasebe |
| 2007/0018437 | A1 | 1/2007 | Hasebe |
| 2007/0018438 | A1 | 1/2007 | Hasebe |
| 2007/0024032 | A1 | 2/2007 | Hasebe |
| 2007/0108743 | A1 | 5/2007 | Muller |
| 2007/0205591 | A1 | 9/2007 | Bito |
| 2007/0262572 | A1 | 11/2007 | Fischer |

FOREIGN PATENT DOCUMENTS

| | | | |
|---|---|---|---|
| JP | 10-71911 A | * | 3/1998 |
| JP | 2005-206067 | * | 8/2005 |

* cited by examiner

*Primary Examiner*—Ruth Ilan (57) ABSTRACT

Air bag assembly is inflatable by an inflator mounted on the vehicle forward of the vehicle occupant seat. The air bag assembly has a vertical extending, occupant facing restraining surface located at a distance from the air bag base end. An air bag base wall extends generally horizontally from a base end mounted on the inflator and divides the air bag assembly into a lower air bag portion for restraint of the occupant lower torso and an upper air bag portion for restraint of the upper torso. The upper air bag portion includes an inflatable left hand lobe rising from the left side of the base wall and an inflatable right lobe rising from the right side of the base wall. The left and right hand lobes define an upper un-inflated void space, the lower extent of which is provided by the horizontal extending base wall.

20 Claims, 9 Drawing Sheets

SPLIT TOP AIR BAG ASSEMBLY

FIELD OF THE INVENTION

The present invention relates to an inflatable air bag assembly for a motor vehicle and more particularly provides an air bag assembly having a split top arrangement with a right-hand lobe and a left-hand lobe.

BACKGROUND OF THE INVENTION

It is well known in motor vehicles to provide an air bag assembly which inflates to restrain a vehicle occupant. An air bag inflator is mounted on the vehicle body forwardly of the vehicle seat. The air bag is mounted on the inflator so that activation of the inflator will generate gas to fill the air bag and expand the air bag from a folded-up stored condition to an inflated position in which the air bag fills the space in front of the seated occupant. A typical air bag includes an upper portion for restraining the upper torso and a lower portion for restraining the lower torso.

It is desirable to shape the air bag to tune the occupant restraining characteristics of the air bag assembly.

SUMMARY OF THE INVENTION

An air bag assembly is inflatable by an inflator mounted on the vehicle forward of the vehicle occupant seat. The air bag assembly includes an air bag mounting end mounted on the inflator. The air bag assembly has a vertical extending, occupant facing restraining surface located at a distance from the air bag base end. An air bag base wall extends generally horizontally from the base end toward the vehicle seat and divides the air bag assembly into a lower air bag portion for restraint of the occupant lower torso and an upper air bag portion for restraint of the upper torso. The upper air bag portion includes an inflatable left hand lobe rising from the left side of the base wall and an inflatable right lobe rising from the right side of the base wall. The left and right hand lobes define therebetween an upper un-inflated void space, the lower extent of which occupant un-inflated void space is provided by the generally horizontal extending base wall.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and not intended to limit the invention, its application, or uses.

Figure 1:
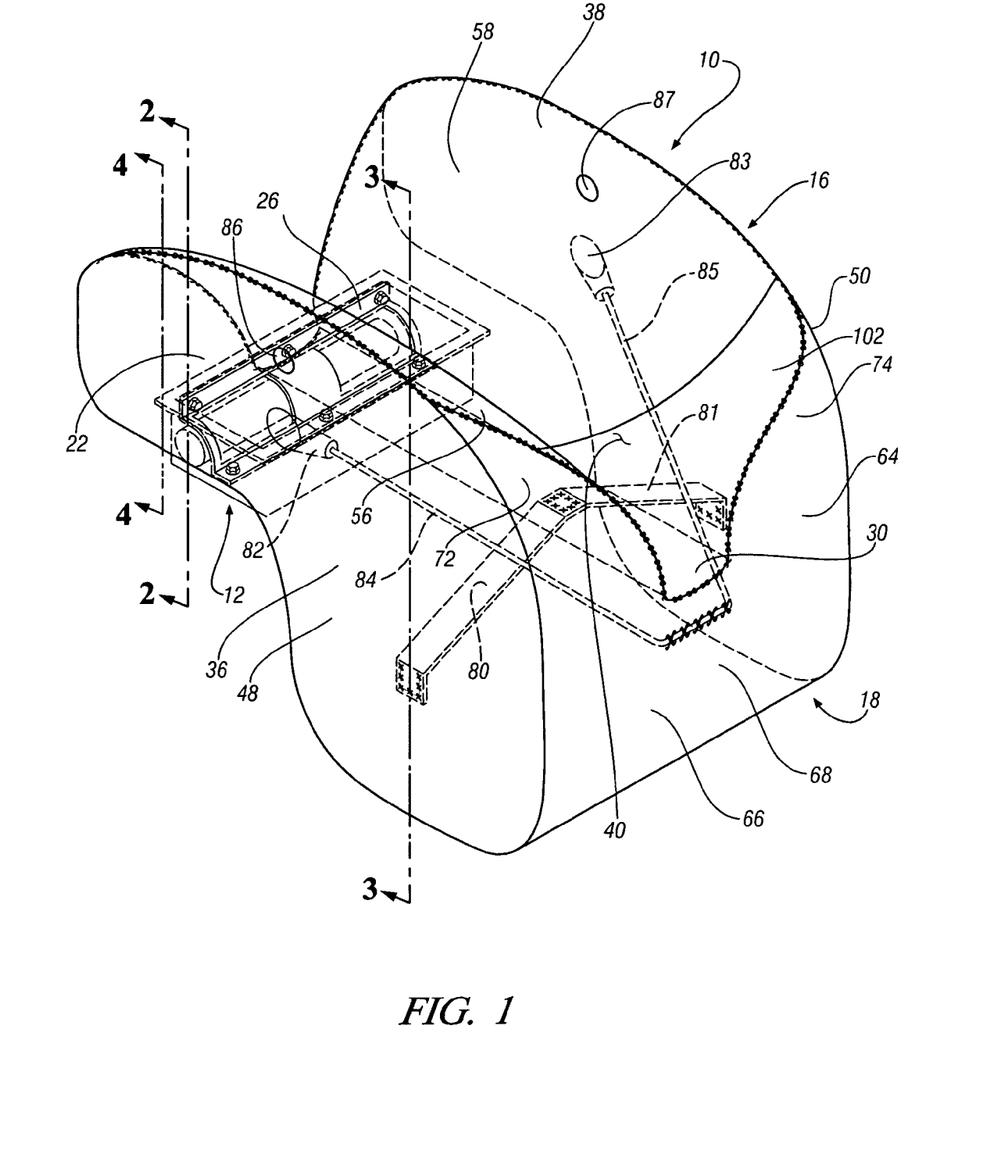
FIG. 1 is a perspective view of an inflated air bag assembly according to the invention and showing an inflated left hand lobe and right hand lobe.
Figure 2:
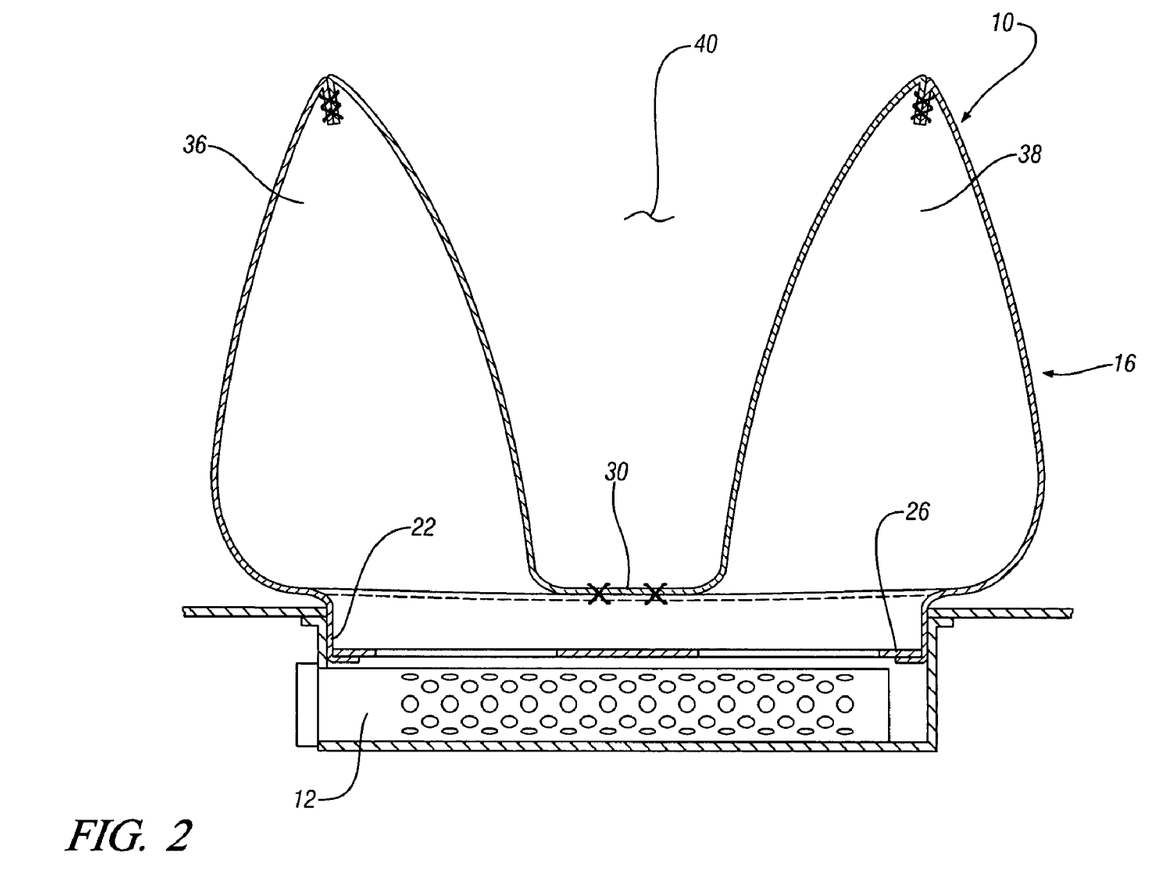
FIG. 2 is a cross-section view taken in the direction of arrows 2-2 of FIG. 1 and showing the air bag mounted on the air bag inflator.
Figure 3:
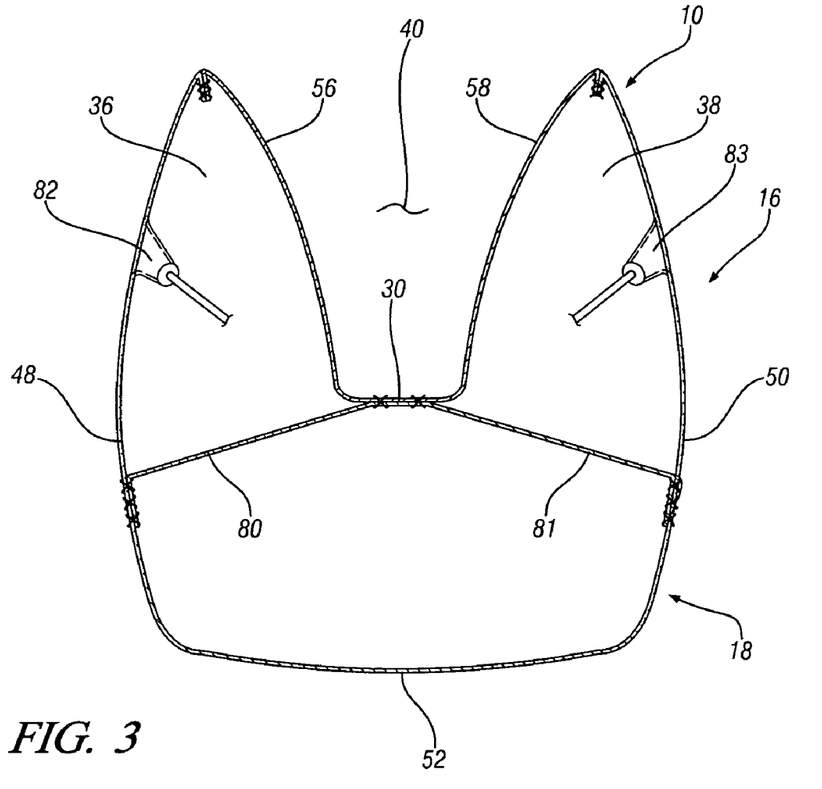
FIG. 3 is a section view taken in the direction of arrows 3-3 of FIG. 1 and showing the cross section through the center of the inflated air bag.
Figure 4:
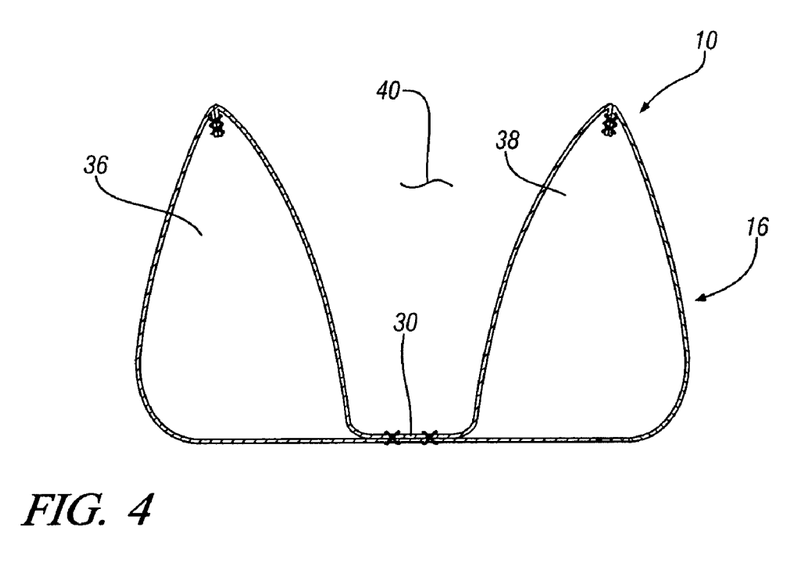
FIG. 4 is a section view taken in the direction of arrows 4-4 of FIG. 1 and showing a cross-section of the air bag forwardly of the air bag inflator.
Figure 5:
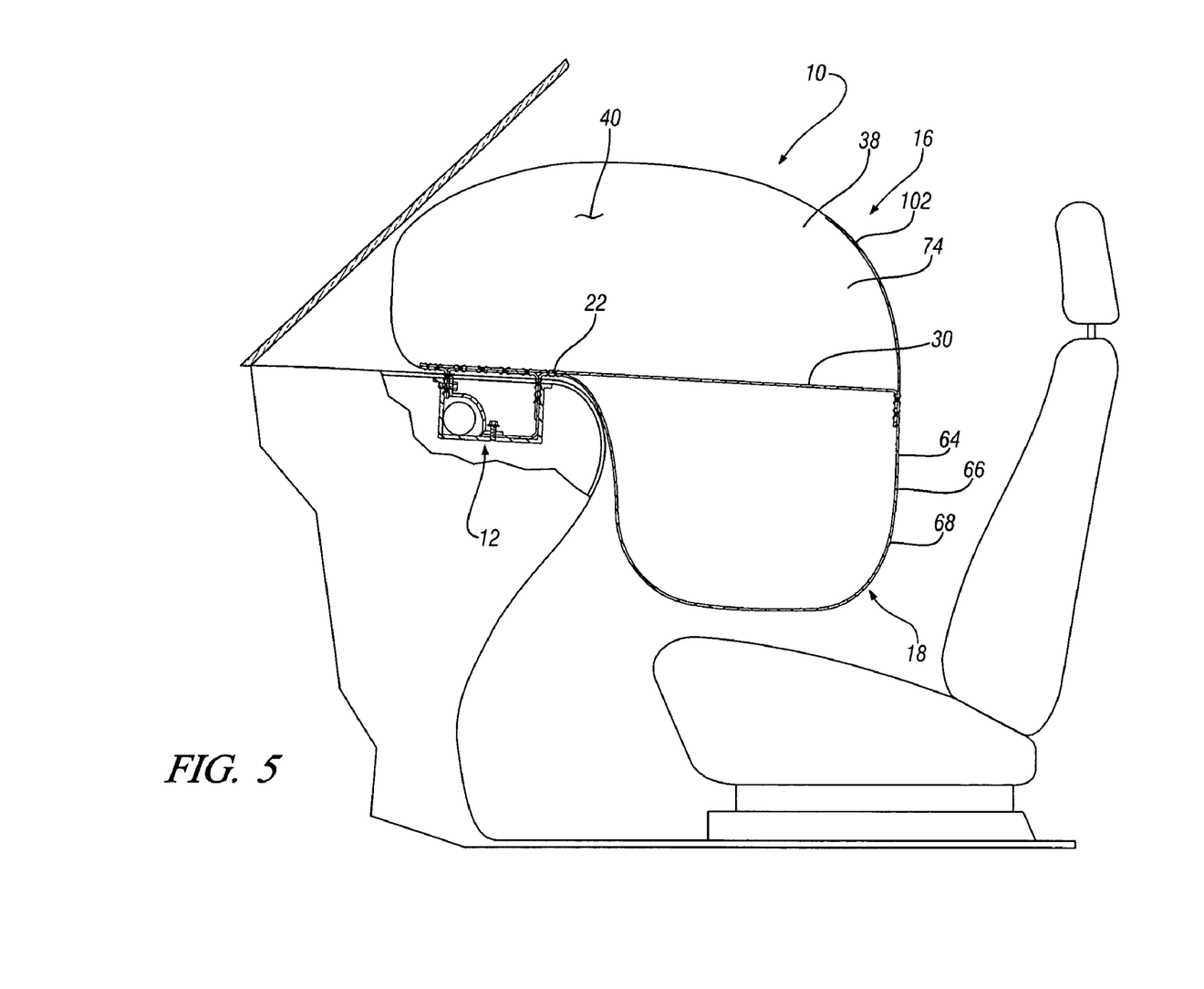
FIG. 5 is a side elevation view of the inflated air bag of FIG. 1.

In FIGS. 1 through 5, a first embodiment of the invention is shown in which an air bag assembly generally indicated at 10 is mounted to an inflator assembly, indicated generally at 12. As best seen in FIGS. 1, 3 and 5, the air bag assembly 10 includes generally an upper air bag portion 16 for a restraint of the occupant upper torso and a lower air bag portion 18 for restraint of an occupant lower torso. The air bag is constructed of fabric materials, well known in the air bag industry and is normally folded in a stored condition atop the inflator assembly 12. On activation of the inflator assembly 12, gas is generated to inflate the air bag assembly 10 to its inflated condition as shown in the drawings.

As best seen in FIG. 2, the air bag assembly 10 includes a bag base 22, which is attached to the inflator assembly 12 by a cushion retainer plate 26. Air bag assembly 10 includes a base wall 30 that extends generally horizontally from the air bag base 22 at the inflator and extends generally horizontally toward the seated occupant. The upper torso air bag portion 16 is divided by the base wall 30 into a left hand lobe 36 and a right hand lobe 38, thereby providing between the lobes 36 and 38 an upper un-inflated void space 40. More particularly, as best seen in FIG. 3, the air bag assembly 10 is constructed by stitching together several sheets of fabric to provide the desired shape. In FIG. 3, it is seen that the air bag assembly 10 includes a left hand wall 48 and a right hand wall 50 that are connected together at their bottom ends by a bottom wall 52. The upper end of the left hand wall 48 is connected to the base wall 30 by a generally vertical wall 56. Likewise, the right hand wall 50 is connected to the base wall 30 by a generally vertical wall 58. As best seen in FIGS. 1 and 5, a vertical extending rear end wall 64 faces toward the vehicle occupant and is generally Y-shaped, including a lower wall portion 66 that forms a lower torso contacting surface 68 and left and right hand wall portions 72 and 74 that provide occupant facing restraining surfaces of the left hand lobe 36 and the right hand lobe 38. As seen in FIGS. 1 and 5, the vertical extending rear end wall 64 is sewn to the horizontal base wall 30 to thereby form the juncture between the lower air bag portion 18 and the left hand lobe 36 and right-hand lobe 38 of the upper air bag portion 16. Accordingly, the length of the base wall 30 will establish the location of the occupant restraining wall 64 from the seat and from the inflator assembly 12.

As best seen in FIG. 3, the left hand side wall 48 and right hand side wall 50 are tethered to the base wall 30 respectively by tether straps 80 and 81 to thereby give shape to the air bag assembly 10. Dynamic vents, 82 and 83 are provided respectively in the left hand wall 48 and the right hand wall and are operated by tethers 84 and 85 attached to the vertical extending rear end wall 64. Examples of such dynamic vents are provided in U.S. Pat. Nos. 5,280,953 and 5,246,250. Also, vent openings 86 and 87 are provided in the left hand side wall 48 and the right hand side wall 50 to vent inflation gas from the air bag assembly 10.

As seen in FIG. 1, a rearward connecting wall member 102 extends between, and is sewn or otherwise attached to the left hand wall portion 72 and the right hand wall portion 74. The wall 102 will naturally be under tension due to the spreading apart of the left hand and left hand lobes 36 and right hand lobe 38 by the inflation gases. The connecting wall member 102 may be as simple as a sheet of fabric material that is sewn to the left and right lobes. Or the connecting wall member 102 may be a sheet of fabric material that is integral to the left and right hand wall 72 and 74 and the lower wall portion 66. Or the connecting wall member 102 could be a piece of fabric that runs adjacent the walls 72, 74 and 66 and that wraps around the air bag assembly 10 and is sewn or otherwise attached to the outer side walls of the air bag assembly 10, so that the piece of fabric can move vertically during cushion deployment if the cushion is obstructed by an object.

As viewed in FIGS. 1 through 5, it will be seen and appreciated that the aforedescribed structure effectively divides the air bag 10 into the lower air bag portion 18 for restraint of the occupant lower torso, and the split top arrangement of the upper air bag portion 16 including its separate left hand lobe 36 and right hand lobe 38. The horizontal base wall 30 functions to connect the separate left and right hand lobes and define the lower limit of the un-inflated void space 40.

Figure 6:
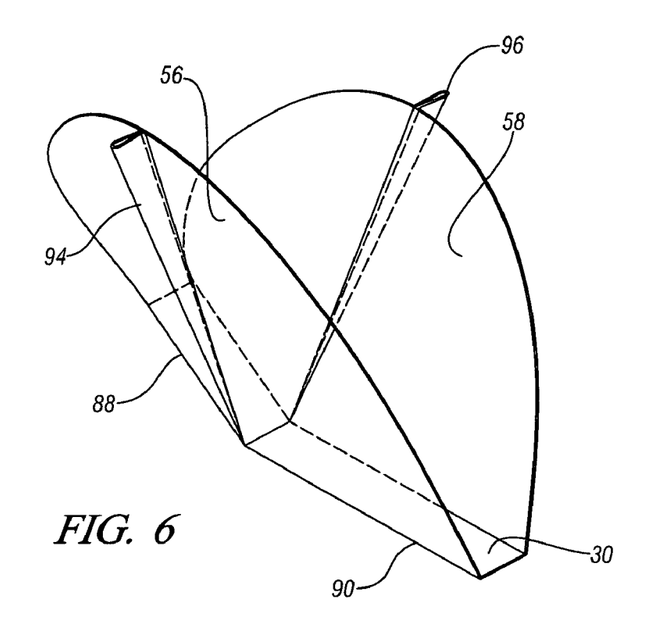
FIG. 6 is a fragmentary view showing how the base wall connecting the right and left hand lobes can be angled somewhat with respect to the horizontal.

Referring to FIG. 6, another embodiment is shown where the base wall 30 has a forwardmost portion 88 and a rearward portion 90 that are angled somewhat relative to one another in the generally horizontal plane. Such an angling of the base wall 30 may be employed to tune the air bag and is accomplished most readily by sewing a tuck 94 in the left vertical wall 56 and a tuck 96 in the right vertical wall 58. Thus, the size of the tuck will determine the extent of the angular variation between the two base portions 88 and 90 of the base wall 30.

Figure 7:
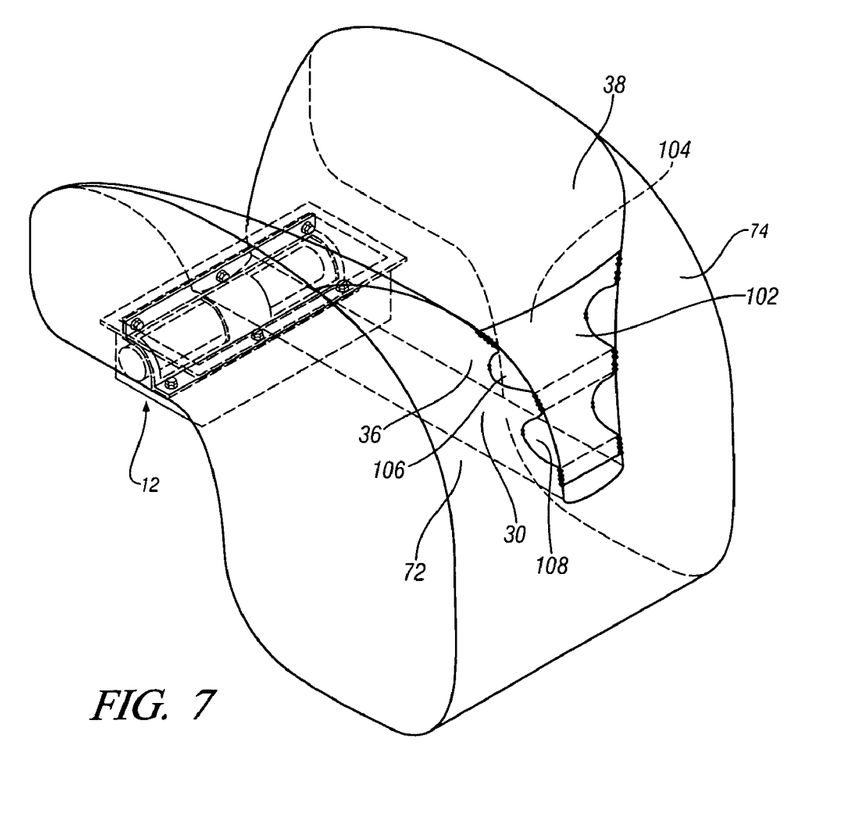
FIG. 7 is a perspective view of another embodiment of the air bag shown in the inflated condition.
Figure 8:
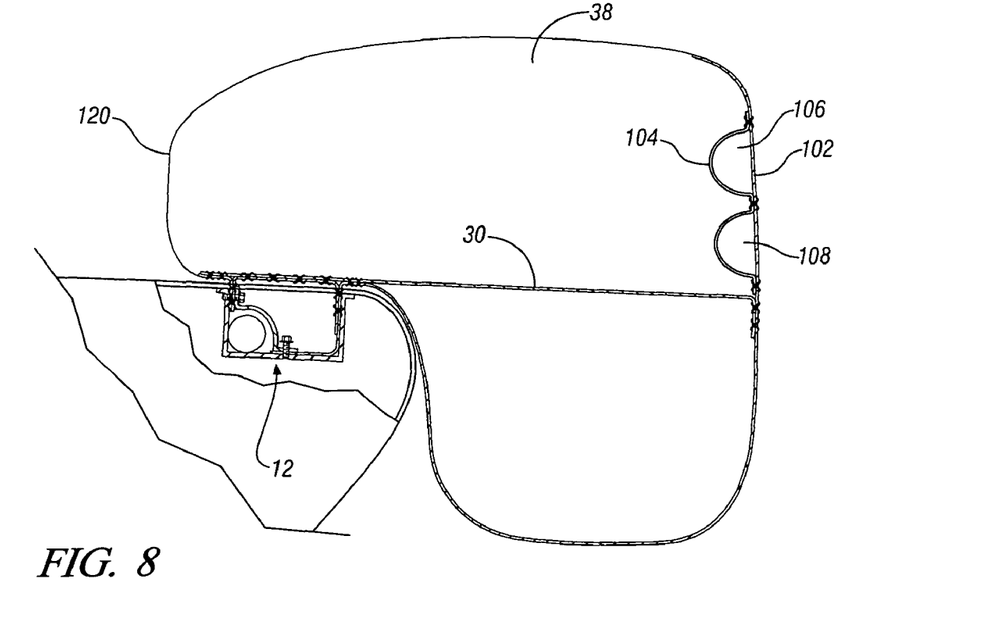
FIG. 8 is a side elevation of the air bag of FIG. 7.

FIG. 7 shows another embodiment which is similar to the first embodiment of FIG. 1 and accordingly has like elements designated by like reference numerals. As shown in FIGS. 7 and 8, the rearward connecting wall member 102 is provided and extends between spaced apart left hand wall portion 72 and right hand wall portion 74. The rearward connecting wall member 102 will naturally be under tension due to the spreading apart of the left hand lobe 36 and right hand lobe 38 by the inflation gases. If desired, the connecting member 102 may be as simple as a sheet of fabric material that is sewn to the left and right lobes. If additional stiffness is desired, an additional fabric 104, best seen in FIG. 8, is sewn onto the connecting wall 102 to thereby define inflated air chambers 106 and 108 that will stiffen the connection between the left lobe 36 and right lobe 38 provided by the rearward connecting wall member 102. Upon forward excursion of the occupant upper torso, the rearward connecting wall member 102 will receive the upper torso. If additional stiffness is desired, an additional fabric 104, best seen in FIG. 8, is sewn onto the connecting wall 102 to thereby define a three-dimensional shape such as is achieved with chambers 106 and 108 that will stiffen the connection between the left lobe 36 and right lobe 38 provided by the rearward connecting wall member 102. Chambers 106 and 108 may be inflated by inflator gas with passageways to the left lobe 36 and right lobe 38. These chambers 106 and 108 may also be uninflated. If they are not inflated, the chambers may have holes in them so that outside air can fill them upon cushion expansion.

Figure 9:
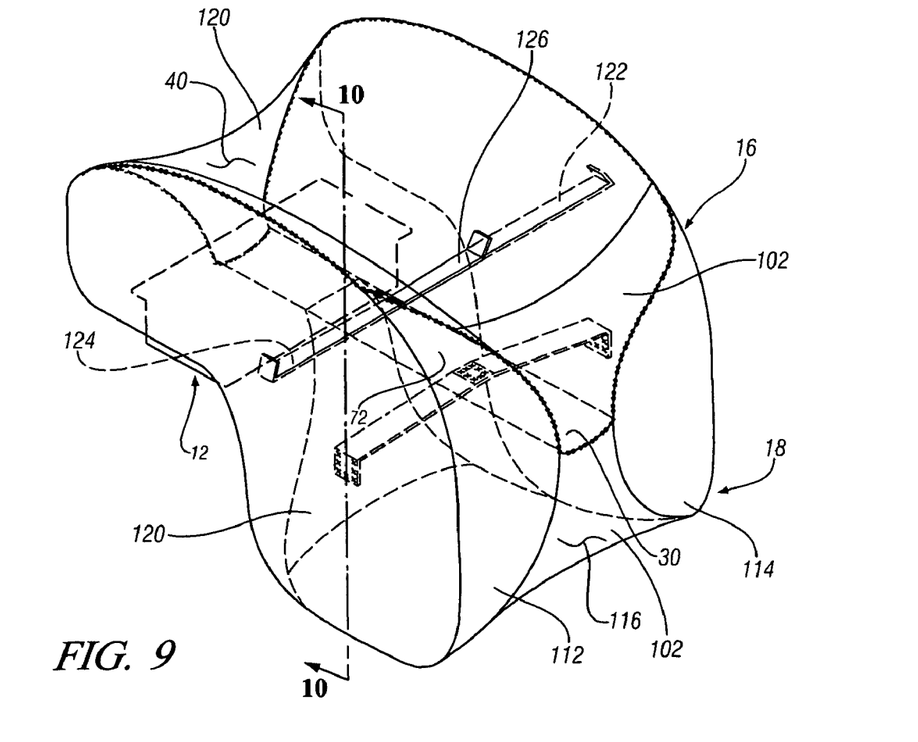
FIG. 9 is a perspective view of another embodiment of the invention in which the lower torso air bag is also divided into left and right hand lobes.
Figure 10:
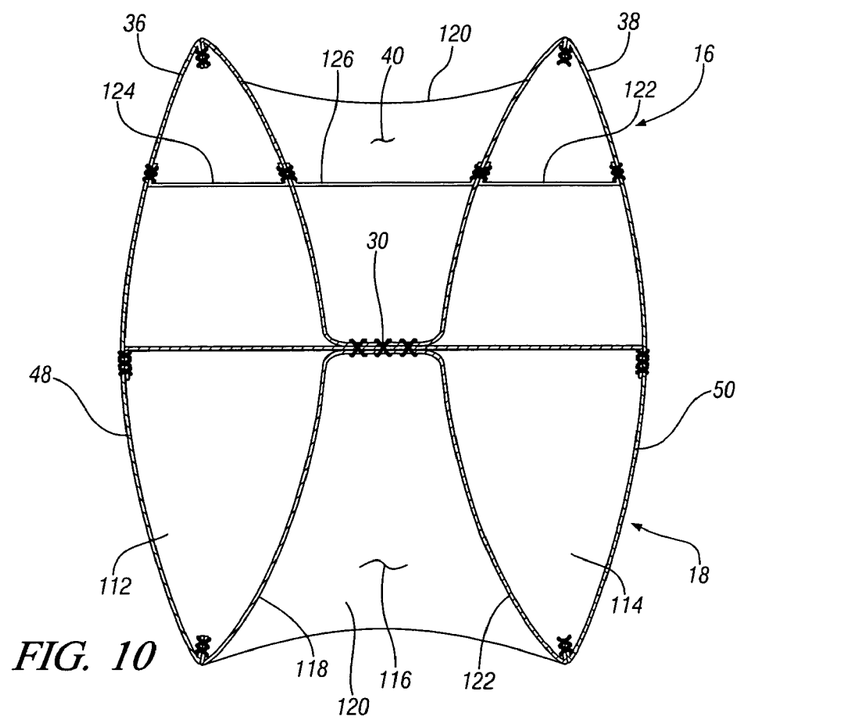
FIG. 10 is a section view through the air bag of FIG. 9 taken in the direction of Arrows 10-10 of FIG. 9.
Figure 11:
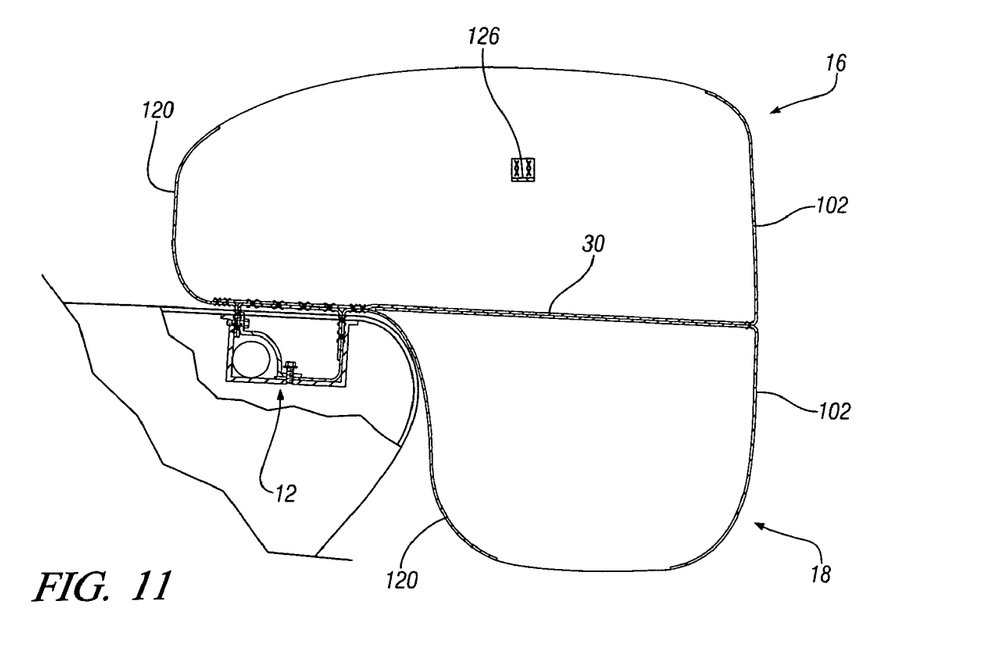
FIG. 11 is a side elevation sectional view of the air bag assembly of FIG. 9.

FIGS. 9, 10 and 11 show yet another embodiment of the invention which is generally similar to the first embodiment and has like elements designated by like numerals. However, as best seen in FIG. 9, the lower torso air bag 18 has been divided into a left hand lobe 112 and a right hand lobe 114 having a lower un-inflated void space 116 there between. In particular, as shown in FIG. 10, the left hand lobe 112 has a wall 118 that connects the lower end of the outer wall 48 to the base wall 30. Likewise, the right hand lobe 18 includes a wall 122 that connects the lower end of the outer right hand wall 50 with the base wall 30. Accordingly, by dividing the lower air bag portion 18 into the left hand lobe 112 and the right hand lobe 114, the lower un-inflated void space 116 is provided. The upper extent of the un-inflated void space 116 is defined by the base wall 30. Thus the air bag arrangement of FIGS. 9, 10 and 11 includes both a split top and a split bottom, separated by the base wall 30. In this case, the rearward connecting wall member 102 also connects between the left hand lobe 112 and the right hand lobe 114, both above and below the base wall 30.

FIG. 9 also shows that a forward connecting wall member 120 is provided to connect together the left lobe 112 and the right hand lobe 114, forward of the inflator 12, similar to the rearward connecting wall member 102. This rearward connecting wall member 102 also connects between the lower left hand lobe 112 and the lower right hand lobe 114, just rearward of the inflator 12.

Also referring to FIG. 10, a tether strap 122 is provided inside the right lobe 38, a tether strap 124 is provided inside the left lobe 36, and a tether strap 126 is provided between the left lobe 36 and the right lobe 38. The tethers 122, 124, and 126 provide shape to the upper air bag portion 16.

Figure 12:
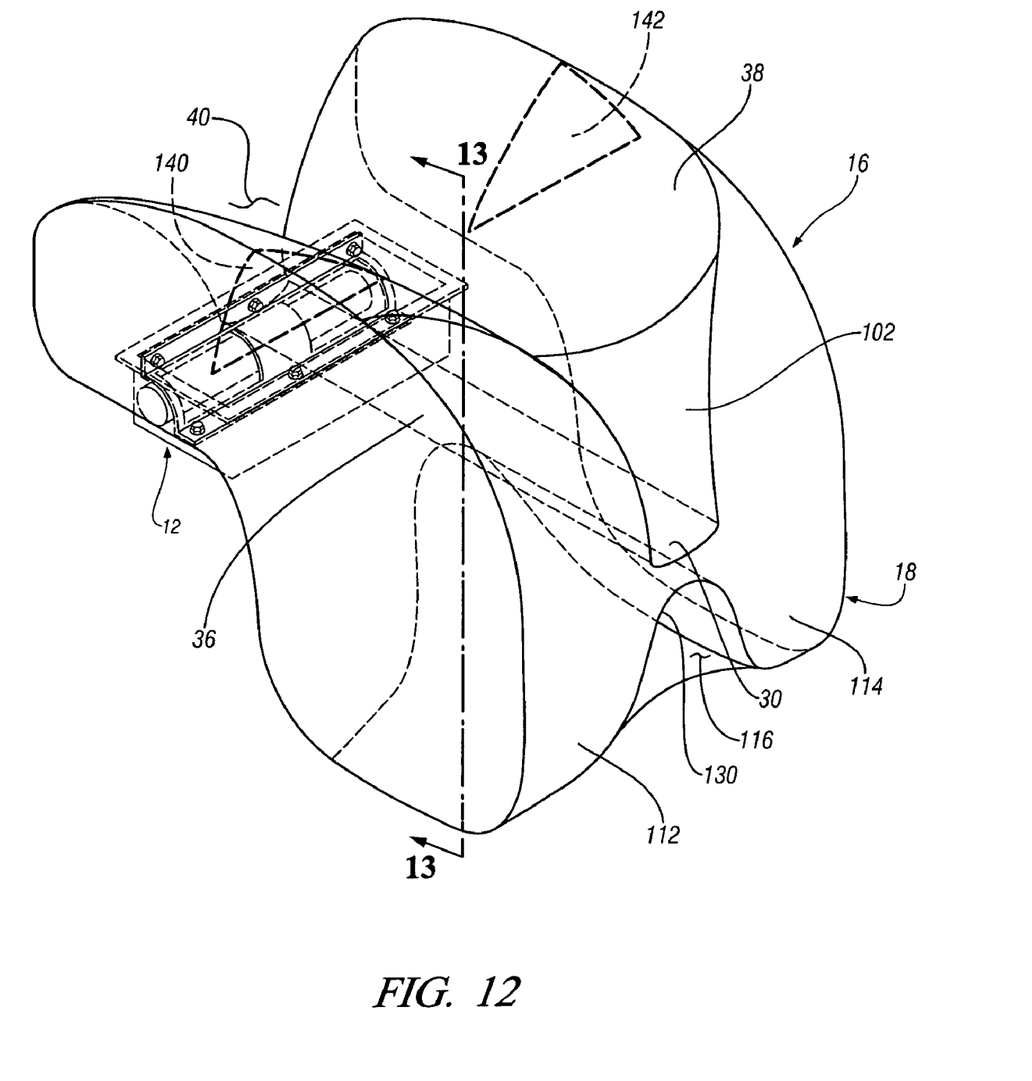
FIG. 12 is a perspective view of yet another embodiment of the invention.
Figure 13:
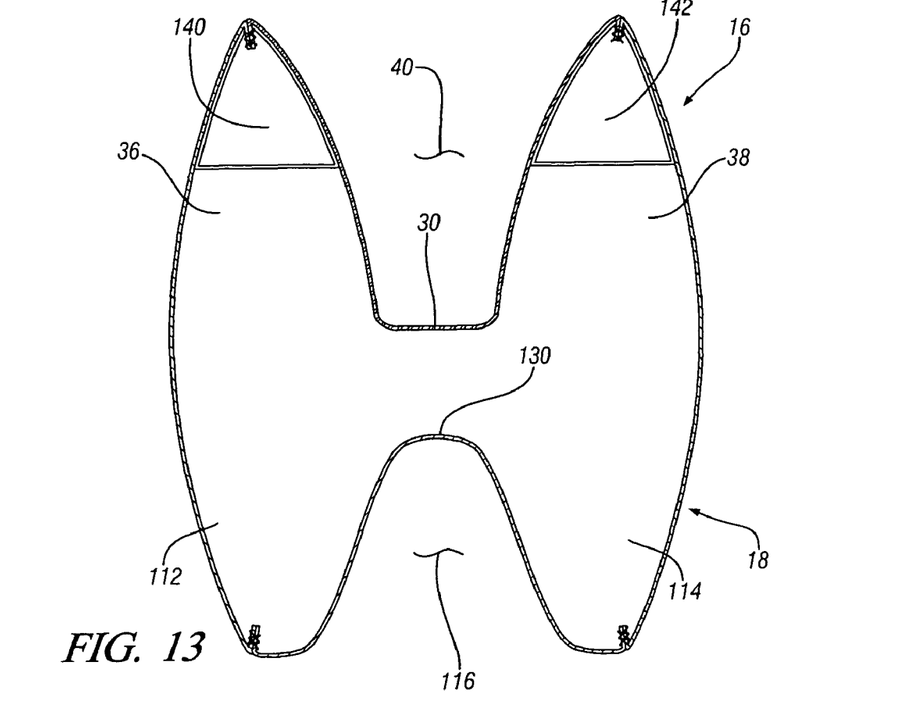
FIG. 13 is a section view taken through the air bag of FIG. 12, and taken in the direction of Arrows 13-13.
Figure 14:
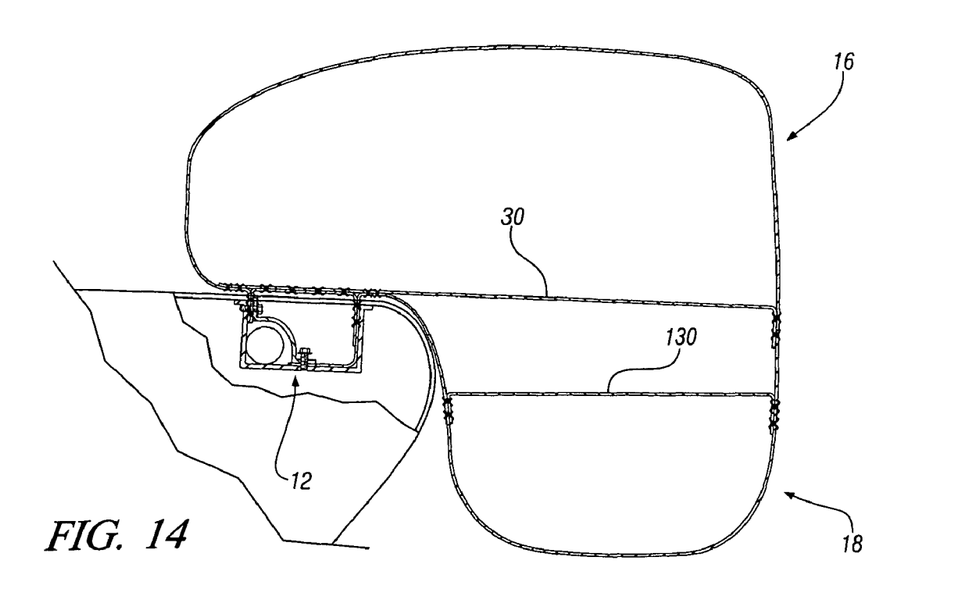
FIG. 14 is a side elevation sectional view of the air bag of FIG. 12.

Referring now to FIGS. 12, 13, and 14, yet another embodiment of the invention is shown and like elements are again designated by like reference numerals. In FIG. 12, the upper air bag portion 16, similar to FIG. 1, is divided into left hand lobe 36 and right hand lobe 38 by the base wall 30 that defines the upper un-inflated void space 40 between the left hand lobe 36 and the right hand lobe 38. In addition, FIG. 12 shows an auxiliary base wall 130 that divides the lower torso air bag 18 into a left lobe 112 and a right lobe 114, and defines the upper extent of a lower un-inflated void space 116. By providing the auxiliary base wall 130, it will be understood that the size of the lower lobes 112 and 114 can be tuned as desired, thereby defining the depth of the lower un-inflated void space 116 that is defined between the lower lobes 112 and 114. FIGS. 12, 13 and 14 also show triangular shaped panels 140 and 142 that are sewn inside of the left lobe 36 and the right lobe 38. These panels 140 and 142 give shape to the air bag, and may also act as baffles to modify or redirect the flow of inflation gas from the inflator assembly during the inflation and assist in air bag kinematics and venting.

The foregoing description of the invention is merely exemplary in nature and, thus, variations thereof are intended to be within the scope of the invention. It is well known in the air bag art that various baffles, tethers, vents and the like may be incorporated into air bag structures in order to control flow of inflation gas into the air bag assembly. Thus, the number and location of tether straps shown herein are merely exemplary, it being understood that upon construction and testing of an air bag for particular vehicle geometry, a person of ordinary skill will add and modify tethers as well as ad baffles and vents to control the direction and rate of air bag inflation. In addition, it will be understood that the location of seams that are made by the sewing together of individual panels is merely exemplary and that air bags having the desired shapes, including the lobes, can be stitched together many different ways. For example, the base wall 30, although it can be an integral part of larger panels, or can be a separate sheet of material that is stitched to the other panels. In addition, the base wall 30 can be of substantial width, or can be as narrow as a single line of stitching. Thus the width of the base wall 30 and the length of the base wall are variables that can be modified in order to tune the air bag to provide the desired performance characteristics. Furthermore, if desired, the rearward panel 120 and the forward panel 102 can be connected together over the top of the air bag, and/or under the bottom of the air bag, thereby creating a cover for the upper uninflated void spaces 40 and the lower uninflated void space 116. In this case, at least one large vent hole would be provided to vent ambient air into the uninflated void spaces.

What is claimed is:

1. An air bag assembly inflatable from an inflator mounted on the vehicle forward of a vehicle occupant seat, said air bag comprising:
   an air bag mounting end adjacent to the inflator;
   a vertical extending occupant facing restraining surface located at a distance from the air bag base end and having a lower portion for restraint of the occupant lower torso and an upper portion for restraint of the upper torso;
   an air bag base wall extending generally horizontally from the base end toward the vehicle seat and dividing the air bag assembly into a lower torso portion for restraint of the occupant lower torso and an upper torso portion for restraint of the upper torso;
   said upper portion including an inflatable left hand lobe rising from the left side of the base wall and an inflatable right lobe rising from the right side of the base wall, said left and right hand lobes defining therebetween an upper un-inflated void space, the lower extent of the upper un-inflated void space being provided by the horizontal extending base wall;
   and a fabric connecting member connecting the left hand lobe and the right hand lobe above the horizontal base wall.

2. The air bag of claim 1 further comprising the fabric connecting member being provided at the occupant facing restraining surface.

3. The air bag of claim 1 further comprising the fabric connecting member being an inflatable panel containing at least one chamber.

4. The air bag of claim 1 further comprising the fabric connecting member connecting the left hand lobe and the right lobe at the forward end of the lobes closest to the windshield.

5. The air bag of claim 1 further comprising one or more tethers extending from the base wall to the lower torso portion of the air bag.

6. The air bag of claim 1 further comprising said generally horizontal base wall having a first portion closest the inflator and a second portion closest the vehicle seat, and said first portion and second portion being at an angle to one another.

7. The air bag of claim 1 further comprising said lower torso portion having a right hand lower lobe and a left hand lower lobe defining a lower un-inflated void space therebetween.

8. The air bag of claim 7 further comprising said right hand lower lobe and said left hand lower lobe each being attached to the horizontal extending base wall of the air bag.

9. An air bag assembly inflatable from an inflator mounted on the vehicle forward of a vehicle occupant seat, said air bag comprising:
   an air bag mounting end adjacent to the inflator;
   a vertical extending occupant facing restraining surface located at a distance from the air bag base end and having a lower portion for restraint of the occupant lower torso and an upper portion for restraint of the upper torso;
   an air bag base wall extending generally horizontally from the base end toward the vehicle seat end and dividing the air bag assembly into a lower air bag portion for restraint of the occupant lower torso and an upper air bag portion for restraint of the upper torso;
   said upper air bag portion including an inflatable left hand lobe rising from the left side of the base wall and an inflatable right lobe rising from the right side of the base wall, said left and right hand lobes of the upper air bag portion defining therebetween an upper un-inflated void space;
   a fabric connecting member connecting the left hand lobe and the right hand lobe of the upper bag portion above the horizontal base wall; and
   said lower air bag portion including an inflatable left hand lobe depending downwardly from the left side of the base wall and an inflatable right lobe depending downwardly right side of the base wall, said left and right hand lobes of the lower air bag portion defining therebetween a lower un-inflated void space.

10. The air bag assembly of claim 9 further comprising the upper extent of the lower un-inflated void space being provided by the horizontal extending base wall.

11. The air bag assembly of claim 9 further comprising the lower extent of the upper un-inflated void space provided by the horizontal extending base wall.

12. The air bag assembly of claim 11 further comprising an auxiliary base wall located beneath the horizontal base wall and defining the upper extent of the lower un-inflated void space.

13. The air bag of claim 11 further comprising the fabric connecting member connecting the left hand lobe and the right lobe of the upper air bag portion being provided at the forward end of the lobes.

14. The air bag of claim 9 further comprising the fabric connecting member connecting the left hand lobe and the right hand lobe of the upper air bag portion being provided at the occupant facing restraining surface.

15. The air bag of claim 9 further comprising the fabric connecting member being an inflatable panel containing at least one chamber.

16. The air bag of claim 9 further comprising one or more tethers extending from the base wall to the left and right hand lobes of the lower torso portion of the air bag.

17. The air bag of claim 9 further comprising one or more tethers extending between the left and right hand lobes of the upper torso portion of the air bag.

18. The air bag of claim 9 further comprising a fabric connecting member connecting the left hand lobe and the right hand lobe of the lower air bag portion.

19. The air bag of claim 18 further comprising one or more tethers extending from the base wall to the left and right hand lobes of the lower torso portion of the air bag.

20. The air bag of claim 18 further comprising one or more tethers extending between the left and right hand lobes of the upper torso portion of the air bag.

* * * * *